United States Patent [19]

Gwynette et al.

[11] Patent Number: 4,461,515

[45] Date of Patent: Jul. 24, 1984

[54] FIBER GLASS FILAMENT WOUND WHEEL

[75] Inventors: Greswold Gwynette; Robert S. Cordaro, both of Shelby, N.C.

[73] Assignee: PPG Industries, Inc., Pittsburgh, Pa.

[21] Appl. No.: 334,781

[22] Filed: Dec. 28, 1981

[51] Int. Cl.³ .............................................. B60B 3/00
[52] U.S. Cl. ................................ 301/63 PW; 152/323
[58] Field of Search ............... 301/63 PW, 5.3, 5.7; 152/323, 324; 16/45–47; 428/66

[56] References Cited

U.S. PATENT DOCUMENTS

| | | |
|---|---|---|
| 316,847 | 4/1885 | Taylor . |
| 1,349,914 | 4/1920 | Pratt . |
| 1,523,043 | 1/1925 | Ukman . |
| 2,000,769 | 5/1935 | Mansur ............................. 428/66 X |
| 2,241,684 | 5/1941 | Ware ................................... 301/5.3 |
| 2,525,196 | 10/1950 | Bacon ................................ 152/323 |
| 3,666,322 | 5/1972 | Pickron ............................... 301/63 |
| 3,730,244 | 5/1973 | Ross .................................. 152/323 |
| 3,843,202 | 10/1974 | Lacerte ............................... 301/63 |
| 3,894,776 | 7/1975 | Black ................................. 301/63 |
| 3,952,786 | 4/1976 | Kreling et al. ...................... 152/323 |
| 4,040,670 | 7/1977 | Williams ............................ 301/5.3 |
| 4,071,279 | 1/1978 | Chung ................................ 301/63 |
| 4,128,254 | 12/1978 | Powell ............................ 280/87.40 |
| 4,146,274 | 3/1979 | Lejeune ............................... 301/97 |
| 4,164,251 | 8/1979 | Chung ............................... 152/323 |
| 4,217,944 | 8/1980 | Pascal ............................... 152/323 |
| 4,244,413 | 1/1981 | Takashashi et al. ............... 152/323 |

Primary Examiner—Joseph J. Rolla
Assistant Examiner—Kevin P. Shaver
Attorney, Agent, or Firm—John E. Curley

[57] ABSTRACT

The present invention is directed generally to a fiber glass filament wound wheel. More particularly, the present invention is directed to a fiber glass filament wound wheel reinforced with an epoxy resin. Most specifically, the present invention is directed to a filament wound, resin, fiber glass reinforced wheel for use, for example, on a transport cart and to a method and apparatus for forming the wheel. The wheels of the invention are formed by a filament winding process wherein a continuous strand of fiber glass is coated with a suitable curable resinous binder, such as a liquid epoxy resin catalyst mixture, and is wound on a metal core between spaced side plates which are shaped to define the shape of the side walls of the finished wheel. The assembly is cured for a suitable period of time and the side plates are removed. A bearing assembly can then be inserted in the wheel in the aperture defined by the core and the wheel assembly can be placed on a transport truck. The filament wound, fiber glass resin reinforced wheel resists heat and contact with corrosive substrates and does not harm the surface of the floor over which the transport cart to which the wheels are attached rolls.

3 Claims, 7 Drawing Figures

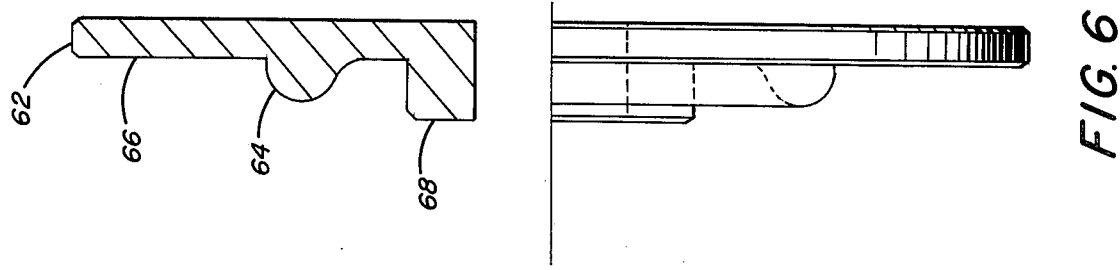
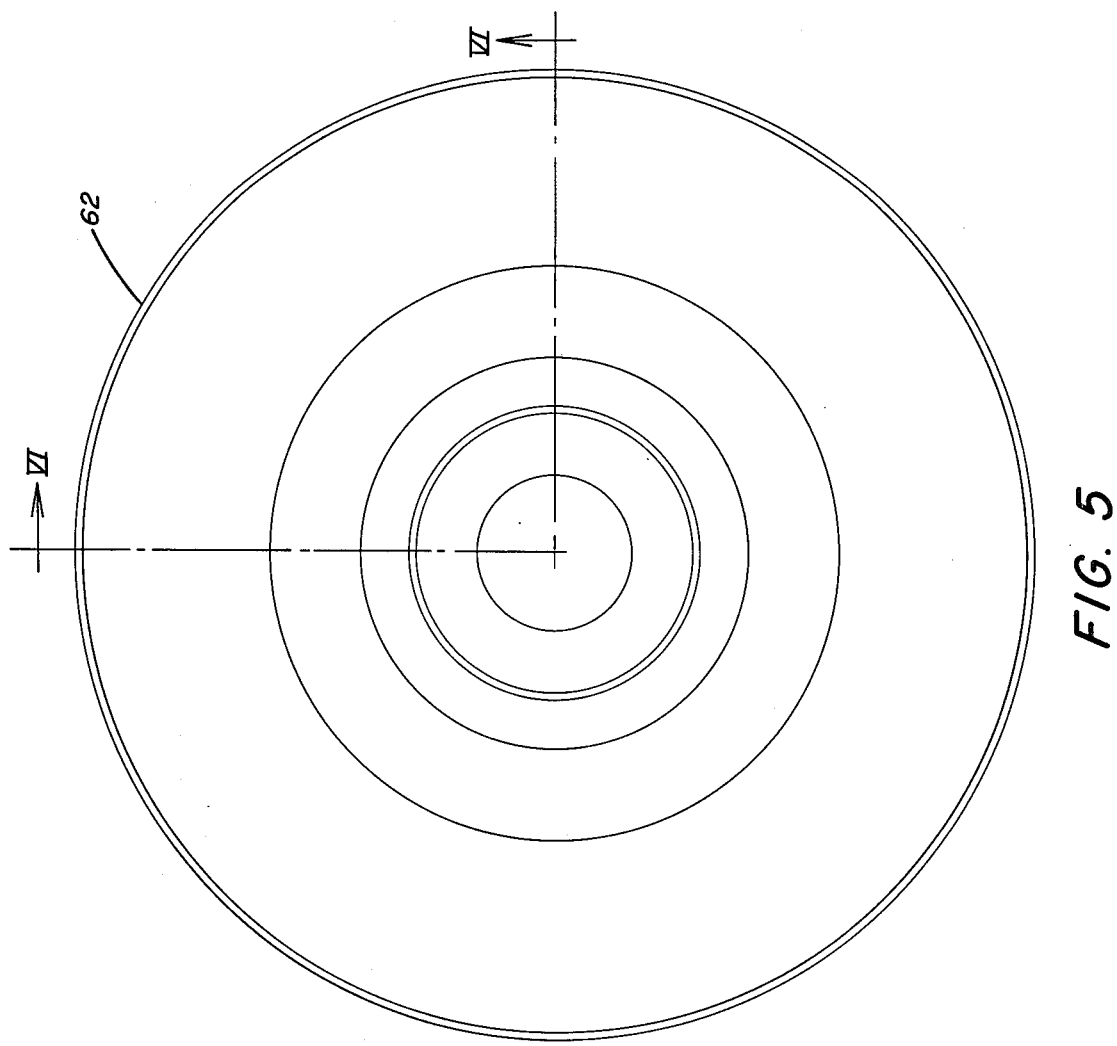

FIBER GLASS FILAMENT WOUND WHEEL

FIELD OF THE INVENTION

The present invention is directed generally to a fiber glass filament wound wheel. More particularly, the present invention is directed to a fiber glass filament wound wheel reinforced with an epoxy resin. Most specifically, the present invention is directed to a filament wound, resin, fiberglass reinforced wheel for use, for example, on a transport cart and to a method and apparatus for forming the wheel. The wheels of the invention are formed by a filament winding process wherein a continuous strand of fiber glass is coated with a suitable curable resinous binder, such as a liquid epoxy resin-catalyst mixture, and is wound on a metal core between spaced side plates which are shaped to define the shape of the side wall of the finished wheel. The assembly is cured for a suitable period of time and the side plates are removed. A bearing assembly can then be inserted in the wheel in the aperture defined by the core and the wheel assembly can be placed on a transport truck. The filament wound fiber glass resin reinforced wheel which contains 70 to 80 percent glass filaments by weight resists heat and contact with corrosive substrates and does not harm the surface of the floor over which the transport cart to which the wheels are attached rolls.

DESCRIPTION OF THE PRIOR ART

Wheeled transport dollies, carts and buggys are used in a number of the industrial situations to transport heavy loads from place to place within a plant or manufacturing facility. In many production facilities, transport carts are used to move heavy articles for example to transport fiber glass forming packages from forming areas to various other processing locations in the plant. In the past, these transport trucks have been provided with steel wheels that are supported by various bearing assemblies. These transport trucks often carry substantial loads and may have a total weight in excess of 1,900 pounds. While the steel wheels have withstood the load, they have been very destructive of the plant floors which are usually concrete. These wheels have also tended to rust and corrode when subjected to the environment of the forming area in a fiber glass plant for example.

In an attempt to provide longer wheel life and less damage to the plant floors, various synthetic wheels have been utilized. The various phenolic and other synthetic wheels which have been tried have generally been unsatisfactory due to a low tolerance for the heat and moisture found in the environment in which they operate. These wheels have failed usually due to cracking and breakage.

Since each wheel failure disables a transport truck which must then be unloaded before the wheel can be replaced, wheel failure has an adverse effect on plant efficiency. The steel wheels corrode and are harmful to the plant floors and the synthetic wheels do not tolerate a high moisture and heat environment and fail. Thus, a need exists for a strong, durable wheel which will stand the loads imposed on it and which will provide long and dependable life in high moisture and heat environment.

SUMMARY OF THE INVENTION

It is an object of the present invention to provide a fiber glass filament wound wheel.

A further object of the present invention is to provide a filament wound, epoxy resin reinforced fiber glass wheel.

Still a further object of the present invention is to provide a fiber glass filament wound wheel which will not harm plant floors.

Yet another object of the present invention is to provide a fiber glass filament wound wheel which will be long lasting and durable.

As will be set forth in greater detail in the following description of a preferred embodiment, the filament wound reinforced glass fiber epoxy resin wheel in accordance with the present invention is formed by a process which comprises winding a continuous length of glass fiber filament coated with a curable epoxy resin composition around a hollow metal sleeve or core. The core is positioned on an elongated shaft and cooperates with spaced side plates to define the shape of the wheel during the winding of the filament onto the core. A plurality of similar sleeves or cores may be placed side by side on the elongated shaft between spaced side plates so that a plurality of wheels may be formed concurrently. The side plates may either have planar side walls or may have any desired shape which is imparted to the wheel during the winding of the filament onto the core. After the coated fiber glass filaments have been wound onto the core, the entire assembly is cured, preferably at an elevated temperature, for a length of time sufficient to cure the epoxy resin binder at least to a state where a unitary product is achieved. After such curing, the wheels are removed from the elongated shaft and the side plates are removed. If desired or necessary, additional curing can be accomplished at some point prior to wheel utilization. A bearing assembly can then be inserted into the aperture in the center of the wheel and the wheel is than ready for use on the transport truck.

In contrast with the prior wheels, either steel or synthetic material, the fiber glass filament wound wheels in accordance with the present invention have performed well in actual usage. The fiber glass filaments and the epoxy resin binders are reasonably impervious to the heat and moisture encountered in the forming area. The wheels also withstand the various other materials which they encounter and do not break or crack as other reinforced polymeric wheels employed did. The filamount wound, epoxy resin fiber glass reinforced wheels in accordance with the present invention are also much less damaging to the plant floors than the prior steel wheels and do not cause the concrete to break or crack.

The use of the fiber glass filament wound wheels in accordance with the present invention has drastically reduced wheel failure related downtime of the transport trucks and has thereby increased plant efficiency. Furthermore, the use of the fiber glass wheels in accordance with the present invention has effected substantial cost saving in wheel replacement costs and plant maintenance.

The curable epoxy resin binders of the invention comprise a fluid admixture comprising a polyglcidyl ether of a polyphenol such as bisphenol A, preferably a polyglycidyl ether of bisphenol A such as EPON 826 and a curing or hardening agent such as an acidic anhydride, or polyamine. This class of curable resins and their formulation with curing agents is well known in the art and need not be described in detail here (see for example "Epoxy Resin" by H. Lee and K. Neville, McGraw-Hill (1957) or Kilk-Othener "Encyclopedia of Chemical Technology" among others). The fluid admixture can, if desired, contain fillers, viscosity modifiers, glass-resin adhesion enhancers and the like such as art known in the art.

BRIEF DESCRIPTION OF THE DRAWINGS

While the novel features of the filament wound fiber glass wheel in accordance with the present invention are set forth with particularity in the appended claims, a full and complete understanding of the invention may be had by referring to the detailed description of preferred embodiments as set forth hereinafter and as may be seen in the accompanying drawings in which:

FIG. 5 is an elevation view of a second preferred embodiment of an end side plate in accordance with the present invention;

FIG. 6 is an end view, partly in section, of the side plate of FIG. 5 with the section taken along lines VI—VI of FIG. 5.

DESCRIPTION OF THE PREFERRED EMBODIMENT

Figure 1:
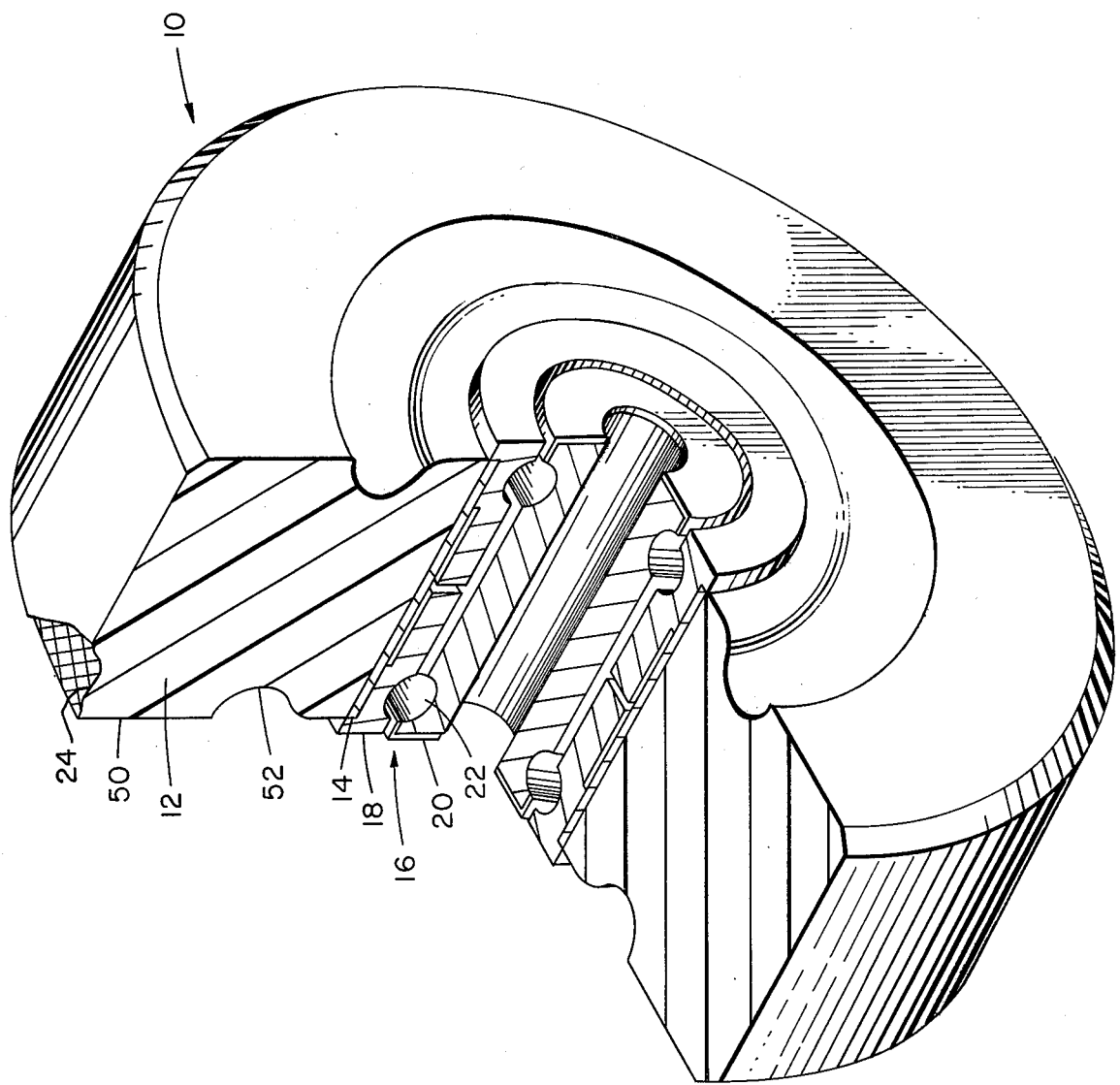
FIG. 1 is a perspective view, partly in section, of a filament wound epoxy fiber glass reinforced wheel in accordance with the present invention.

Turning initially to FIG. 1, there may be seen a first preferred embodiment of a filament wound epoxy fiber glass wheel in accordance with the present invention generally at 10. Wheel 10 is generally conventional in shape and includes a body 12 which is formed about a core or sleeve 14 in a manner which will be discussed in greater detail hereinafter. A bearing assembly 16 which is of conventional construction and includes an outer race 18, an inner race 20, and apertures 22 therebetween for the receipt of balls, is press fit into the central aperture of wheel 10 which is defined by core or sleeve 14. It will be understood that the bearing assembly 16 shown is exemplary of any suitable bearing assembly which could be used, and that instead of the ball bearing assembly there could be used roller bearings, needle bearings, plain bearing surfaces or any other conventional bearing assembly as required by the application to which the wheel will be put.

Body 12 of the wheel 10 is formed by a process comprising winding a continuous fiber glass filament about core or sleeve 14. The continuous glass fiber filament in the form of strand or roving has a binder coating of an epoxy resin or the like applied to it before it is wound on the core 14. In a presently preferred embodiment the binder comprises EPON 826 epoxy resin, ECA-104 anhydride hardener, and Anacamine K-54 in conventional proportions. The binder is coated onto continuous glass strand (e.g. 22-23 microns in diameter) in an amount such that the final wheel contains between about 70 percent to 80 percent by weight glass fiber, preferably about 75 percent by weight glass fiber. The strand is traversed during winding axially with respect to core 14 by any conventional means so that as core 14 is rotated during the winding of the filament thereon, succeeding filament layers will be angled (e.g. in a presently preferred embodiment), the winding angle being about 87°-89° with respect to prior layers as shown by reference number 24 in FIG. 1. The amount of traverse will depend on the width of the wheel and the desired characteristics to be imparted to the wheel. The traversal and strand coating assemblies are generally conventional.

Figure 2:
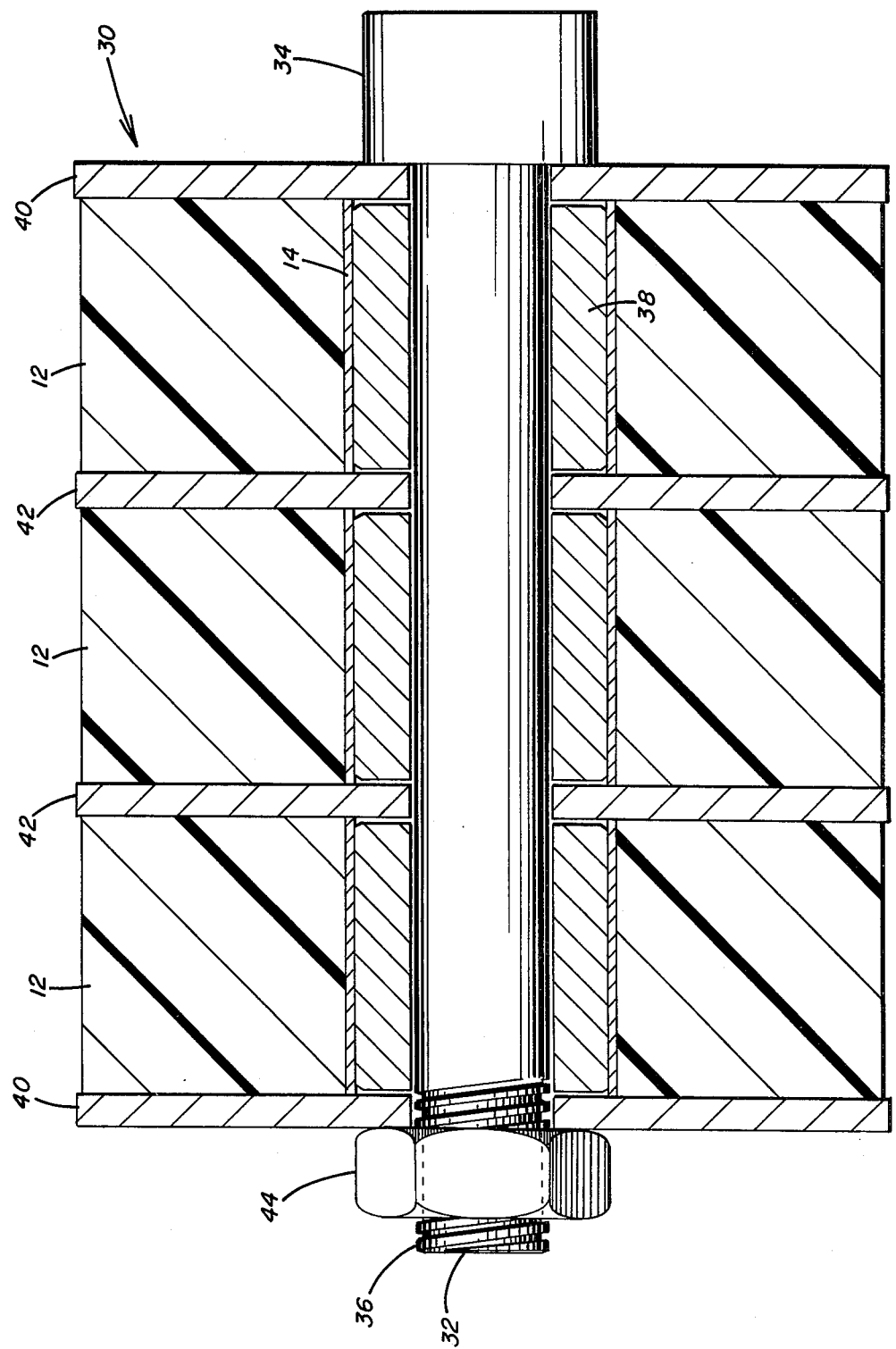
FIG. 2 is a sectional side elevation view of a first embodiment of an apparatus on which the fiber glass wheels in accordance with the present invention are formed.
Figure 4:
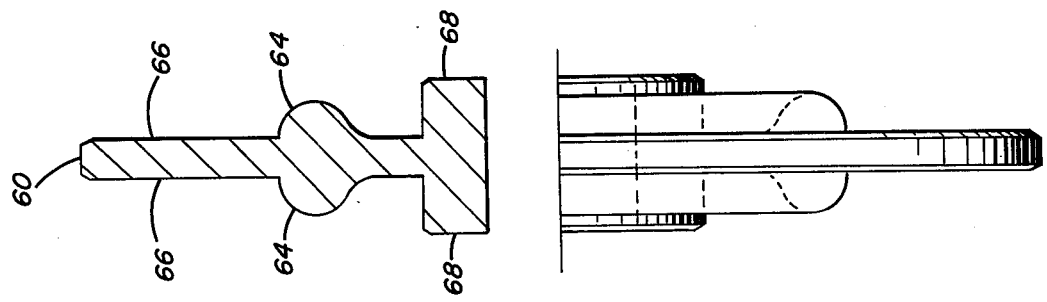
FIG. 4 is an end view, partly in section, of the side plate of FIG. 3 with the section taken along lines IV—IV of FIG. 3.
Figure 3:
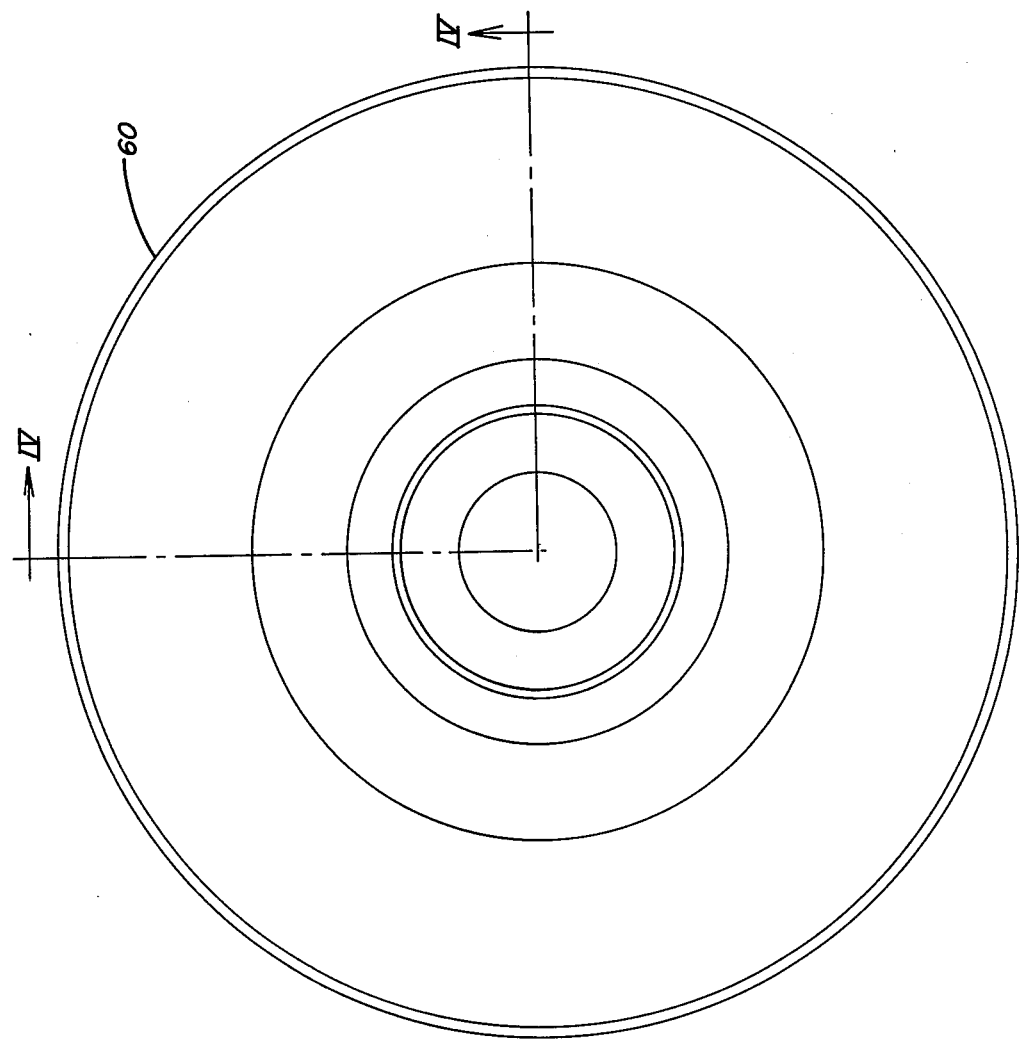
FIG. 3 is an elevation view of a second preferred embodiment of an intermediate side plate in accordance with the present invention.

Referring now to FIG. 2, there may be seen a first preferred embodiment of a wheel forming apparatus, generally at 30, in accordance with the present invention. Wheel assembly or forming apparatus 30 includes an elongated shaft 32 which forms the central support for plurality of wheel bodies 12 during the formation of the fiber glass filament wound wheels of the present invention. Shaft 32 has an enlarged head 34 at a first end and a threaded second end 36. A plurality of sleeve hubs 38 are supported on elongated shaft 32. These sleeve hubs have an inner diameter corresponding to the diameter of shaft 32 and an outer diameter which corresponds to the size of the bearing assembly 16 which will eventually be used. Each sleeve hub 38 carries a core or sleeve 14 on its outer periphery with the glass fiber filaments being wound about core or sleeve 14. The outer surface of each core or sleeve 14 may be roughened to ensure good adherence of the curable composition coated fiber glass filament at the inception of winding.

Since a plurality of wheels are formed at the same time on the same elongated shaft, as may be seen in FIG. 2, side plates are used to separate the wheels from each other. As may be seen in FIG. 2, end plates 40 and intermediate side plates 42 are placed along elongated shaft 32 with, in the embodiment shown in FIG. 2, the intermediate and end side plates 42 and 40 respectively being similarly shaped generally in the form of flat sided disks. These side plates are placed on either side of each sleeve hub 38 and are held in place on the shaft 32 by a nut 44 which engages the threaded end 36 of shaft 32.

The shape of the fiber glass filament wound wheel is determined by the diameter and width of the sleeve 14 and by the diameter and side wall shape of the side plates 40 and 42 which, in the embodiment shown in FIG. 2, are planar and hence produce a wheel with a planar sidewall. It is often desirable to produce a wheel with a sidewall 50 having a recessed portion 52 each as is shown in FIG. 1. This is accomplished by the use of side plates having a shape obverse to that which the formed wheel is to have. A set of such side plates are shown in FIGS. 3-6 with an intermediate side plate 60 being seen in FIGS. 3 and 4 and an end side plate 62 being shown in FIGS. 5 and 6. These side plates would form the wheel shape shown in FIG. 1 since they have an outward projection 64 on their side surfaces 66 which corresponds to the shape of recess 52 in sidewall 50 of wheel body 12. It will be understood that only one such projection 64 need be provided on each end of side plate 62, as may be seen in FIGS. 6 and 7. The recess 52 so formed in sidewall 50 of wheel body 12 may be used to aid in securing a dust cover to the wheel once it has been assembled.

The embodiment of the intermediate and end side plates 60 and 62 shown in FIGS. 3-6 also show a second embodiment of a sleeve hub structure wherein sleeve hubs are an integral part of the side plates. Each side plate 60 or 62 has a portion of a sleeve hub 68 formed thereon. In usage, the side plates 60 and 62 are slid onto shaft 32 with the hub portions 68 combining to form the sleeve hub over which the core 14 is slid, as may be seen most clearly in FIG. 7. If necessary, a spacer sleeve 70 can be interposed between the two sleeve hub portions 68 to form a wider wheel.

Figure 7:
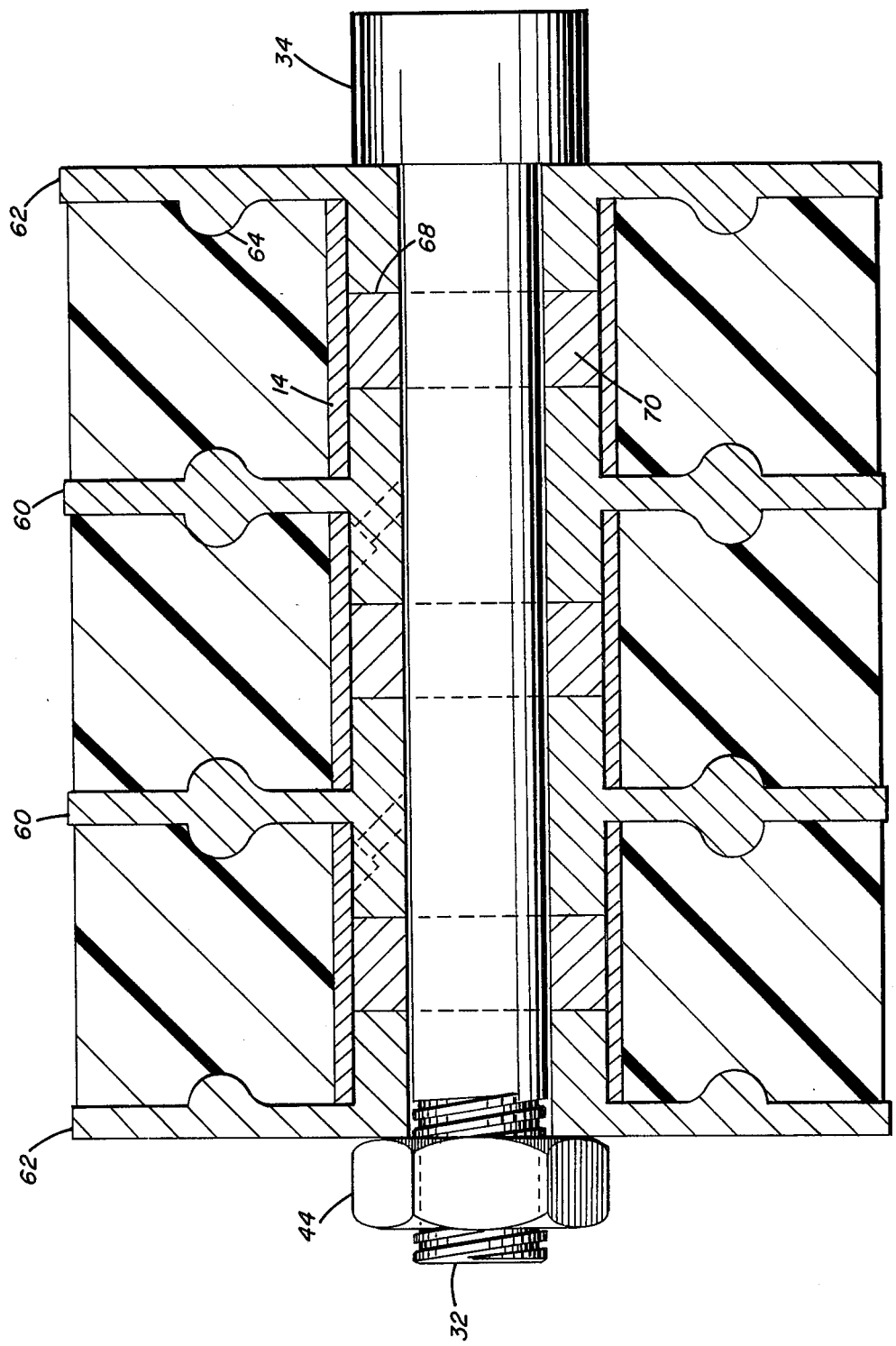
FIG. 7 is a sectional side elevation view of a second embodiment of an apparatus on which the glass fiber wheels in accordance with the present invention are formed.

In use in forming wheels, the elongated shaft 32 and the sleeve hubs, side plate and sleeves are assembled as shown in either FIG. 2 or FIG. 7 and the completed assembly is mounted for rotation by any suitable means. Fiber glass filaments which have been coated with a fluid curable epoxy resin composition are fed through a strand transversal device and the filament end is initially hand-wound on the outer roughened surface of core 14. The assembly is then caused to rotate so that fiber glass filament is continuously wound around core 14 and is traversed between the spaced side plates to form a wheel body 12 having a sidewall shape dictated by the shape of the side plates. The elongated shaft 32 is then removed from the rotary means and the assembly is cured at an elevated temperature for a pre-selected length of time until the wheels are cured. After curing, the nut 44 is removed and the side plates and sleeve hubs are stripped from the wheel bodies 12. The bearing assemblies 16 are then inserted and the wheel is ready for installation on a transport truck.

While a preferred embodiment of a glass fiber filament wound wheel and apparatus for its manufacture have been fully and completely set forth hereinabove, it will be obvious to one of skill in the art that a number of changes in, for example, the curable epoxy composition, the number of wheels formed on an elongated shaft, the shape of the side plates the type of bearing used and the like could be made without departing from the time spirit and scope of the invention and that accordingly the invention is to be limited only by the following claims.

We claim:

1. A heat and moisture resistant solid wheel comprising a core adapted to receive a bearing, successive layers of fiber glass filaments wound around the core, said filaments being coated with a curable polyglycidyl ether of a bisphenol A to form a wheel around said core and the said polyglycidyl ether being cured to form the solid wheel, and wherein the fiber glass filaments in the solid wheel are present in an amount of 70 to 80 percent by weight, the balance being the cured polyglycidyl ether.

2. A wheel as in claim 1 wherein the polyglycidyl ether is cured by an anhydride hardening agent.

3. A wheel as in claim 1 wherein the winding angle of succeeding filament layers is between about 87 to about 89 degrees with respect to prior layers.

* * * * *